United States Patent Office 3,064,056
Patented Nov. 13, 1962

3,064,056
PROCESS FOR THE PRODUCTION OF DISULPHIDES AND POLYSULPHIDES CONTAINING HYDROXYL GROUPS
Josef Ebersberger, Leverkusen, Hans Holtschmidt, Koln, and Rudolf Stroh, Leverkusen, Germany, assignors to Farbenfabriken Bayer Aktiengesellschaft, Leverkusen, Germany, a corporation of Germany
No Drawing. Filed Aug. 26, 1959, Ser. No. 836,047
Claims priority, application Germany Sept. 24, 1958
11 Claims. (Cl. 260—608)

This invention relates to a process for the production of disulphides and polysulphides containing hydroxyl groups.

It is an object of the present invention to provide a process for the production of disulphides and polysulphides containing hydroxyl groups. Another object of the present invention is to provide said disulphides and polysulphides by a process which can be carried out in a simple and most economic manner. A further object of the present invention is to use alkylene oxides as initial materials for the production of disulphides and polysulphides containing hydroxyl groups. Still further objects will become apparent hereinafter.

According to the present invention disulphides and polysulphides containing hydroxyl groups can be produced by reacting an alkylene oxide with a mixture of sulphur and hydrogen sulphide in the presence of a basic catalyst. Whether a disulphide, trisulphide or higher polysulphide is obtained as the main reaction product depends on the quantity of sulphur employed. Disulphides are obtained by employing approximately 1 gram atom of sulphur per 2 mols of alkylene oxide and trisulphides by employing approximately 2 gram atoms of sulphur per 2 mols of alkylene oxide. Higher polysulphides result from the employment of proportionately greater quantities of sulphur.

Alkylene oxides suitable for employment in the process according to the present invention are, for example, ethylene oxide, propylene oxide, butylene oxide, styrene oxide, cyclohexene oxide and their substitution products, such as glycide, glycide ethyl ether, phenoxy propene oxide, glycide acetate, glycidic acid ethyl ester, 9,10-epoxy stearic acid and epichlorhydrin. Alkylene polyoxides, such as butadiene dioxide, isoprene dioxide, diallyl dioxide, diglycide ether, p-phenylene-di-oxypropene oxide and piperazine dipropene oxide can also be employed.

Suitable basic catalysts are organic bases, such as triethylamine, piperidine and their salts with organic acids, such as formic acid, acetic acid and benzoic acid, as well as inorganic bases, such as alkali hydroxides, alkali sulphides, alkali carbonates and ammonium acetate. The basic catalysts may be produced in situ. For example, the strong base triethylol sulphonium hydroxide, which is very suitable for employment as a basic catalyst in the present process, may be formed in situ by adding thiodiglycol to a reaction mixture containing ethylene oxide. The amount of catalyst employed is not critical and depends on the nature of the catalyst. The catalyst is usually employed in an amount of from 1% to 20% by weight based on the weight of the alkylene oxide and preferably in an amount of from 5% to 18% by weight.

The process according to the present invention can in many cases be carried out at room temperature. In other cases, it is preferable to work at temperatures up to 140° C. or even higher. In many cases, it is preferable to add to the reaction mixture an organic diluent which is inert to the reactants and products under the reaction conditions. Examples of suitable diluents are hydrocarbons, ether, dioxane and alcohols. The reaction products may also be used as diluents. The process according to the present invention can be carried out under pressure and either batchwise or continuously.

The quantity of sulphur employed depends on the final products which are required. For example, approximately 1 gram atom of sulphur, preferably a slight excess, is used in the production of disulphides and 2 gram atoms of sulphur, preferably a slight excess, in the production of trisulphides, the amount of sulphur in each case being based on 2 mols of alkylene oxide. Proportionately greater quantities of sulphur are used for the production of higher polysulphides. It is impossible, however, to avoid the formation of small quantities of undesired polysulphides even by employing exactly stoichiometric quantities of the reactants and difficulty may be experienced in some cases in isolating the desired reaction product from the resulting mixture of polysulphides, especially when polysulphides of relatively high valency are being produced.

The compounds obtained by the process of the present invention can be employed for the production of dyes, textile and rubber auxiliaries, plastics and plant-protecting agents or as plasticisers for plastics or as additives for fuels and mineral oils. For example, bis-($\beta$-hydroxyethyl)disulphide or trisulphide can be reduced to monothioglycol (see Examples 3 and 6), which can be converted in known manner into $\beta$-hydroxydiethyl sulphide. This latter compound is employed in the synthesis of the plant-protecting agent, 1,2-diethyl-3-ethyl-mercaptoethyl thiophosphoric acid ester.

The present invention is further disclosed in the following examples which are illustrative but not limitative thereof.

Example 1

A mixture is formed of 50 parts by weight of propylene oxide, 64 parts by weight of sulphur, 8 parts by weight of triethylamine and 50 parts by weight of dioxane. The temperature of the mixture is adjusted to from 5° C. to 10° C. by cooling and a further 205 parts by weight of propylene oxide are added dropwise to the reaction mixture over a period of 4 hours while simultaneously introducing hydrogen sulphide. The reaction mixture is stirred and maintained at a temperature of from 5° C. to 10° C. throughout the addition of the propylene oxide and hydrogen sulphide. By the time all the propylene oxide has been added the sulphur has dissolved. The introduction of hydrogen sulphide into the reaction mixture is continued for a few more hours and the reaction mixture is then distilled in vacuo. After a first fraction consisting mainly of dioxane there are obtained 333 parts by weight of bis-(hydroxypropyl)-disulphide as a liquid boiling at 137–139° C. at 1 mm. The yield is 91.5% of the theoretical.

Analysis.—$C_6H_{14}O_2S_2$—calculated: 39.56% C, 7.69% H, 35.16% S. Found: 39.80% C, 7.63% H, 35.90% S.

Example 2

Hydrogen sulphide is introduced into a mixture of 40 parts by weight of styrene oxide, 16 parts by weight of sulphur and 5 parts by weight of triethylamine at a temperature of from 5° C. to 25° C. and a further 80 parts by weight of styrene oxide are added dropwise to the reaction mixture over a period of 30 minutes, while continuing the introduction of hydrogen sulphide. The reaction mixture is stirred throughout the addition of the hydrogen sulphide and styrene oxide. All the sulphur is dissolved within 5 minutes after the completion of the addition of the styrene oxide. The introduction of hydrogen sulphide into the reaction mixture is continued for a further 1½ hours at the end of which time a further 16 parts by weight of sulphur and 20 parts by weight of styrene oxide are added to the reaction mixture. A further 100 parts by weight of styrene oxide are then added dropwise to the reaction mixture while continuing the introduction of hydrogen sulphide. All the sulphur has dissolved by the time the addition of the styrene oxide is complete. Hydrogen sulphide is introduced into the reaction mixture for a further 5 hours and the reaction product is then freed from readily volatile fractions by heating it to 100° C. at 5 mm. 301 parts by weight of bis-(phenylhydroxyethyl)-disulphide are obtained as a viscous residue in a yield of 98.4% of the theoretical.

*Analysis.*—$C_{16}H_{18}O_2S_2$—calculated: 62.75% C, 5.88% H, 20.92% S. Found: 62.33% C, 5.87% H, 21.3% S.

Example 3

Hydrogen sulphide is introduced into a mixture of 100 parts by weight of dioxane, 64 parts by weight of sulphur and 10 parts by weight of triethylamine and 198 parts by weight of ethylene oxide are added dropwise to the reaction mixture over a period of 2 hours, the temperature of the reaction mixture being maintained at from 4° C. to 7° C. throughout the addition of the hydrogen sulphide and ethylene oxide. The sulphur has completely dissolved by the time all the ethylene oxide has been added. Hydrogen sulphide is introduced into the reaction mixture for a further 2 hours and then 64 parts by weight of sulphur are added and a further 198 parts by weight of ethylene oxide over a period of 2 hours. Hydrogen sulphide is introduced into the reaction mixture for a further 7 hours after all the ethylene oxide has been added. The resulting light yellow clear solution is freed from readily volatile fractions by heating it to 100° C. at 5 mm. 603 parts by weight of bis-($\beta$-hydroxyethyl)-disulphide are obtained in the form of a liquid. The yield is 98% of the theoretical. That the compound obtained is actually bis-($\beta$-hydroxyethyl)-disulphide is shown by the fact that it can be reduced to $\beta$-hydroxyethyl-mercaptan $HO.CH_2.CH_2SH$, which is a liquid having a B.P. of 51° C. at 10 mm.

The reduction can be effected in an extremely efficient manner with, for example, zinc-sulphuric acid.

*Analysis.*—$C_2H_6OS$—calculated: 30.77% C, 7.69% H, 41.03% S. Found: 30.70% C, 7.62% H, 41.35% S.

Example 4

Hydrogen sulphide is introduced into a mixture of 100 parts by weight of benzene, 38 parts by weight of sulphur and 8 parts by weight of tri-n-propylamine at a temperature of from 35° C. to 45° C. and 116 parts by weight of cyclohexene oxide are added dropwise to the reaction mixture over a period of 1½ hours. The sulphur dissolves and bis-(o-hydroxycyclohexyl)-trisulphide is precipitated in crystalline form. The introduction of hydrogen sulphide is continued for a few more hours at a temperature of from 50° C. to 60° C. The reaction mixture is then cooled and the reaction product filtered off with suction. The reaction product, which is obtained in a practically quantitative yield, is washed with a little benzene and recrystallised from 275 parts by weight of dioxane. 154 parts by weight of pure bis-(o-hydroxycyclohexyl)-trisulphide having a melting point of 157–158° C. are thus obtained. The yield is 88% of the theoretical.

Bis - (o - hydroxycyclohexyl)-trisulphide $C_{12}H_{22}O_2S_3$—calculated: 48.98% C, 7.48% H, 32.65% S. Found: 49.04% C, 7.56% H, 32.45% S.

Example 5

Hydrogen sulphide is introduced into a mixture of 50 parts by weight of phenoxypropene oxide, 50 parts by weight of benzene, 32 parts by weight of sulphur and 7 parts by weight of tri-n-propylamine at a temperature of from 25° C. to 35° C. and a further 100 parts by weight of phenoxypropene oxide are added dropwise to the reaction mixture over a period of 2½ hours. The sulphur has completely dissolved by the time all the phenoxypropene oxide has been added. The reaction mixture is treated with hydrogen sulphide for a few more hours at a temperature of from 45° C. to 55° C. Readily volatile fractions are distilled off by moderate heating in vacuo and the resulting crude product is recrystallised from methanol. Bis - (phenoxyhydroxypropyl) - trisulphide is obtained in high yield in the form of white crystals having a melting point of 106.5–107° C. and the composition $C_{18}H_{22}O_4S_3$. Calculated: 54.27% C, 5.53% H, 24.12% S. Found: 54.20% C, 5.51% H, 24.2% S.

Example 6

61 parts by weight of thiodiglycol, 200 parts by weight of sulphur and 10 parts by volume of water are heated to 100° C. A powerful stream of a mixture of hydrogen sulphide and ethylene oxide (ratio by volume 1:2) is then passed through the reaction mixture and a further 192 parts by weight of sulphur are slowly added to the reaction mixture over a period of 6 hours. The reaction proceeds exothermically, so that the reaction mixture does not have to be further externally heated. The temperature of the reaction mixture is maintained at from 100° C. to 130° C. throughout the addition of the sulphur. The sulphur dissolves very quickly due to the influence of the strong base which is formed in the reaction mixture by the reaction of ethylene oxide, thiodiglycol and water. 705 parts by weight of a brownish red oil are obtained which has a sulphur content of 51.2%, and which corresponds approximately to the formula $$HO(CH_2)_2S_3(CH_2)_2OH$$

Monothioglycol and hydrogen sulphide are obtained by reducing the trisulphide thus obtained with, for example, powdered zinc and dilute sulphuric acid in accordance with the following procedure:

700 parts by weight of powdered zinc are introduced into a mixture of 5600 parts by weight of 25% sulphuric acid and 340 parts by weight of bis-($\beta$-hydroxyethyl)-trisulphide at a temperature of from 15° C. to 25° C. The monothioglycol thus obtained is filtered off from the excess powdered zinc and extracted, for example with methylene chloride. 263 parts by weight of monothioglycol having a B.P. 64° C./20 mm. are obtained after evaporating the solvent and fractionating the crude product. The yield is 92% of the theoretical.

Example 7

Hydrogen sulphide is introduced into a mixture of 50 parts by weight of propylene oxide, 128 parts by weight of sulphur and 8 parts by weight of tri-n-propylamine at a temperature of from 10° C. to 15° C. and a further 200 parts by weight of propylene oxide are added dropwise to the reaction mixture over a period of 3½ hours. The introduction of hydrogen sulphide into the reaction mixture is continued for a period of 3 hours after all the propylene oxide has been added, by which time the sulphur has completely dissolved. The reaction product is freed from tripropylamine and excess propylene oxide by heating it in vacuo at a moderate temperature. 410 parts by weight of crude bis-(hydroxypropyl)-trisulphide are obtained (sulphur content 43.3%). The yield is 96% of the theoretical.

We claim:

1. A process for the production of sulphides containing hydroxyl groups selected from the group consisting of disulphides and higher polysulphides which comprises reacting, under substantially non-aqueous conditions, 2 mols of alkylene oxide with at the same time at least 1 gram atom of sulphur in molecular form and at least one mol of hydrogen sulphide in the presence of a basic reacting agent as catalyst.

2. A process as claimed in claim 1, wherein as an alkylene oxide there is used an alkylene oxide selected from the group consisting of ethylene oxide, propylene oxide, butylene oxide, styrene oxide, cyclohexene oxide, glycide, glycide ethyl ether, phenoxy propene oxide, glycide acetate, glycidic acid ethyl ester, 9,10-epoxy stearic acid, epichlorhydrin, butadiene dioxide, isoprene dioxide, diallyl dioxide, diglycide ether, p-phenylene dihydroxy propene oxide and piperazine dipropene oxide.

3. A process as claimed in claim 1, wherein said catalyst is employed in an amount of from 1 to 20% by weight based on the weight of said alkylene oxide.

4. A process as claimed in claim 1, wherein said reaction is effected in the presence of an inert diluent.

5. A process as claimed in claim 4, wherein said inert diluent is a member selected from the group consisting of hydrocarbons, ethers, dioxane and alcohols.

6. A process according to claim 1, wherein 2 mols of alkylene oxide are reacted with a molar excess of hydrogen sulphide and approximately 1 gram atom of sulphur.

7. A process according to claim 1, wherein 2 mols of alkylene oxide are reacted with a molar excess of hydrogen sulphide and about 2 gram atoms of sulphur.

8. A process for the production of bis-(hydroxy-propyl)-disulphide which comprises reacting under substantially non-aqueous conditions, propylene oxide with, at the same time, hydrogen sulphide and sulphur in molecular form in the presence of trimethylamine as catalyst and in the additional presence of dioxane, and recovering said bis-(hydroxypropyl)disulphide thereby formed.

9. A process for the production of bis-(phenylhydroxyethyl)-disulphide, which comprises reacting under substantially non-aqueous conditions styrene oxide with hydrogen sulphide and with, at the same time, hydrogen sulphide and sulphur in molecular form in the presence of triethylamine as catalyst, and recovering the bis-(phenylhydroxyethyl)-disulphide thereby formed.

10. A process for the production of bis-($\beta$-hydroethyl)-disulphide which comprises reacting under substantially non-aqueous conditions ethylene oxide with, at the same time, hydrogen sulphide and sulphur in molecular form in the presence of triethylamine as catalyst and in the additional presence of dioxane, and recovering said bis-($\beta$-hydroethyl)-disulphide thereby formed.

11. A process for the production of bis-(o-hydroxycyclohexyl)-trisulphide, which comprises reacting under substantially non-aqueous conditions cyclohexene oxide with, at the same time, hydrogen sulphide and sulphur in molecular form in the presence of tri-n-propylamine and in the additional presence of benzene, and recovering the bis-(o-hydroxycyclohexyl)-trisulphide thereby formed.

References Cited in the file of this patent

UNITED STATES PATENTS 2,754,333     McCarthy     July 10, 1956